(12) United States Patent
Lin et al.

(10) Patent No.: US 7,412,156 B2
(45) Date of Patent: Aug. 12, 2008

(54) BRUSHLESS DC MOTOR DRIVER CIRCUIT CAPABLE OF REDUCING VIBRATION OR SHOCK NOISE AND METHOD THEREOF

(75) Inventors: Teng-Tsai Lin, Shin-Chu (TW);
Hsuan-Chuan Chen, Shin-Chu (TW);
Wen-Jung Su, Shin-Chu (TW)

(73) Assignee: Feeling Technology Corp., Shin-Chu (TW)

( * ) Notice: Subject to any disclaimer, the term of this patent is extended or adjusted under 35 U.S.C. 154(b) by 150 days.

(21) Appl. No.: 11/557,942

(22) Filed: Nov. 8, 2006

(65) Prior Publication Data

US 2008/0107407 A1    May 8, 2008

(51) Int. Cl.
*H02P 7/06* (2006.01)
(52) U.S. Cl. ............. 388/801; 318/400.23; 318/400.24; 388/902
(58) Field of Classification Search ................. 388/801, 388/902; 318/400.23, 400.24, 400.25, 611, 318/629, 460, 432
See application file for complete search history.

(56) References Cited

U.S. PATENT DOCUMENTS

2006/0267529 A1\* 11/2006 Piefer et al. ................. 318/432

\* cited by examiner

*Primary Examiner*—Karen Masih
(74) *Attorney, Agent, or Firm*—Ming Chow; Sinorica, LLC

(57) ABSTRACT

The present invention discloses a brushless dc motor driver circuit capable of reducing vibration or shock noise and a method thereof. The brushless dc motor driver circuit of the present invention comprises a Time-Voltage Digital/Analog Converter. The Time-Voltage Digital/Analog Converter further comprises: at least one magnetic field detecting circuit, at least one counter, and a signal processor. The Time-Voltage Digital/Analog Converter is connected to a driver circuit of a brushless dc motor and detects the periodically varying magnetic field of the brushless dc motor. Based on the rising time and the falling time of the preceding magnetic field variation, the Time-Voltage Digital/Analog Converter calculates the elapsed time from the current phase-change point and generates a linearly rising signal and a linearly falling signal. Then, those two sets of analog signals are used to drive the brushless dc motor. Thereby, the vibration or shock noise of the brushless dc motor is reduced. Besides, the phase switching rate of the brushless dc motor can be modified via adjusting a first magnetic flux density and a second magnetic flux density of the Time-Voltage Digital/Analog Converter.

25 Claims, 3 Drawing Sheets

BRUSHLESS DC MOTOR DRIVER CIRCUIT CAPABLE OF REDUCING VIBRATION OR SHOCK NOISE AND METHOD THEREOF

BACKGROUND OF THE INVENTION

1. Field of the Invention

The present invention relates to a brushless dc motor driver circuit capable of reducing vibration or shock noise and a method thereof, particularly to a brushless dc motor driver circuit capable of reducing vibration or shock noise and a method thereof, wherein a Time-Voltage Digital/Analog Converter outputs analog signals to drive a brushless dc motor and reduce the vibration or shock noise of the brushless dc motor.

2. Description of the Related Art

The brushless dc motor is also called the Hall motor or the DC Servo Motor, which utilizes a permanent magnet as its rotor and utilizes the Hall effect to detect the position of the rotor. As the brushless dc motor utilizes Hall sensors to determine the excitation sequence and timing, it is also called the electronic phase-switching motor. As the magnetic field (i.e. the driving torque) is applied to the rotor just at the right time, the power is saved, and the torque and efficiency of the motor is promoted. Because the offset voltage of the Hall plate and the instrumentation amplifier are usually larger than the signal detected by the Hall sensor, the traditional amplifier configurations are not suitable for the Hall sensor. Usually the chopper amplifier architecture is used in the conventional Hall motor. However, the chopper amplifier is constrained by its chopping frequency. When a brushless dc motor has a higher rotation speed, the magnetic field variation cannot be effectively reconstructed as the driving voltage for the brushless dc motor during the phase-switching process. Thus, the torque changing rate and the vibration or shock noise will be greater.

Accordingly, the present invention proposes a brushless dc motor driver circuit capable of reducing vibration or shock noise and a method thereof to overcome the abovementioned problems.

SUMMARY OF THE INVENTION

The primary objective of the present invention is to provide a brushless dc motor driver circuit capable of reducing vibration or shock noise and a method thereof, wherein a signal processor generates a linearly-varying driving voltage for a brushless dc motor according to the signals output by Hall sensors (or magnetic field detecting circuits); thereby, the torque of the brushless dc motor changes smoother in the present invention than in the conventional technology, and the vibration or shock noise of the brushless dc motor is reduced.

Another objective of the present invention is to provide a brushless dc motor driver circuit capable of reducing vibration or shock noise and a method thereof, wherein the phase switching rate of a brushless dc motor can be modified via adjusting a first magnetic flux density and a second magnetic flux density of a Time-Voltage Digital/Analog Converter.

The present invention proposes a brushless dc motor driver circuit capable of reducing vibration or shock noise and a method thereof. According to one aspect, the driver circuit of the present invention comprises: at least one magnetic field detecting circuit, at least one counter, and a signal processor. The magnetic field detecting circuit detects the periodically varying magnetic field of a brushless dc motor and outputs detected signals. The counters are connected to the magnetic field detecting circuit and calculate the time interval of a rising magnetic field and the time interval of a falling magnetic field during the magnetic field variation of the brushless dc motor. The signal processor is connected to the counters and divides the time interval of the rising magnetic field and the time interval of the falling magnetic field into a plurality of time segments and generates a corresponding linearly rising signal and a corresponding linearly falling signal according to the time interval of the rising magnetic field, the time interval of the falling magnetic field and the detected signal. The driver circuit receives the two sets of analog signals and uses the two sets of analog signals to drive the brushless dc motor; thus, the torque variation is smoother in the present invention than in the conventional technology, and the vibration or shock noise occurring during the operation of the brushless dc motor is reduced. Besides, the phase switching rate of the brushless dc motor can be adjusted via adjusting a first magnetic flux density and a second magnetic flux density of a Time-Voltage Digital/Analog Converter.

To enable the objectives, technical contents, characteristics and accomplishments of the present invention to be easily understood, the embodiments of the present invention are to be described in detail in cooperation with the attached drawings below.

DETAILED DESCRIPTION OF THE INVENTION

Figure 1:
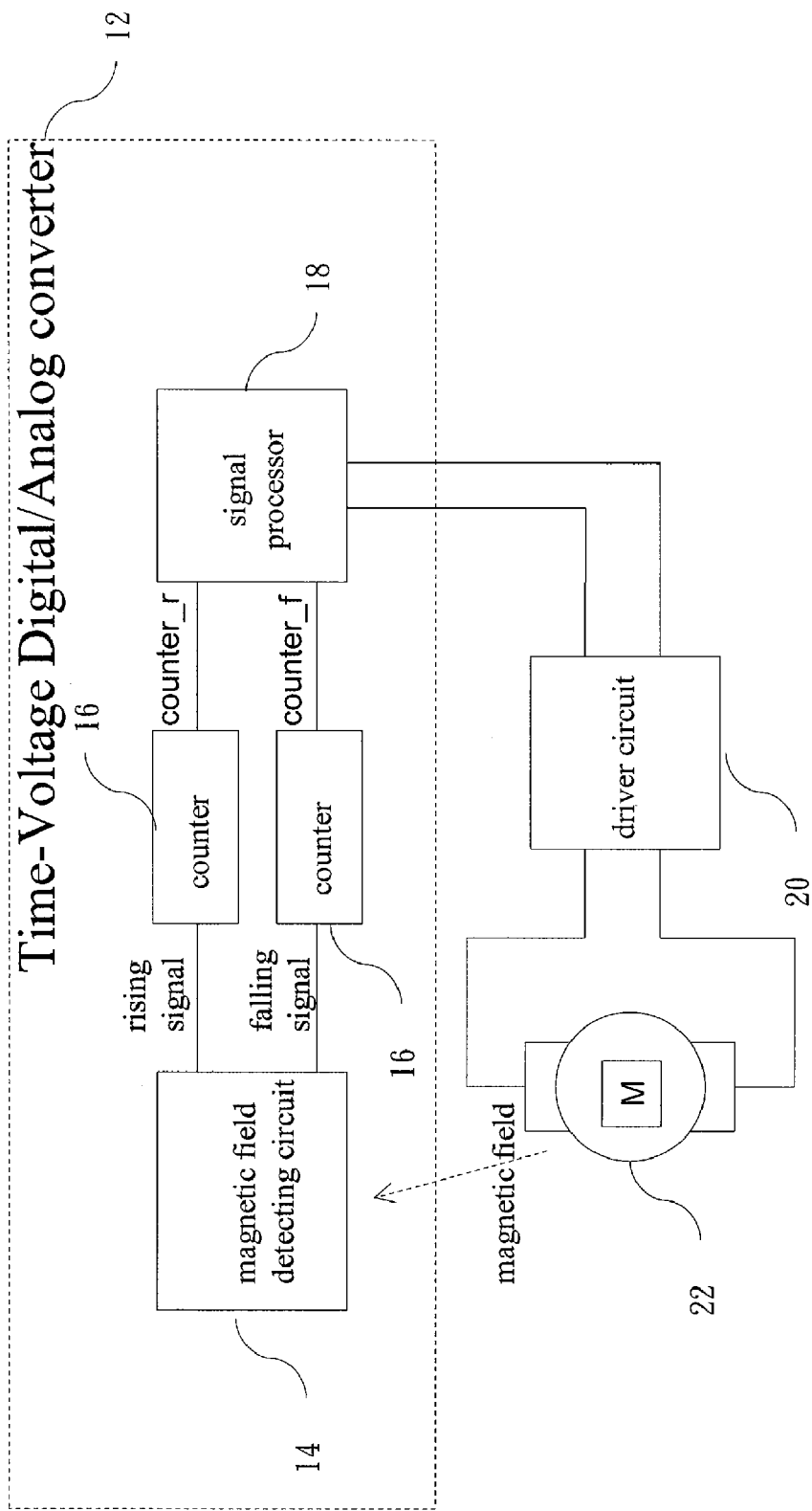
FIG. 1 is a block diagram schematically showing the brushless dc motor driver circuit capable of reducing vibration or shock noise according to the present invention.

Refer to FIG. 1. The brushless dc motor driver circuit capable of reducing vibration or shock noise of the present invention comprises: a Time-Voltage Digital/Analog Converter 12 and driver circuit 20. The Time-Voltage Digital/Analog Converter 12 is connected to the driver circuit 20 and outputs analog signals, which are generated via detecting and processing procedures, to the driver circuit 20. The driver circuit 20 utilizes the analog signals to control a brushless dc motor 22 and reduce the vibration or shock noise thereof. The Time-Voltage Digital/Analog Converter 12 further comprises: at least one magnetic field detecting circuit 14, at least one counter 16, a signal processor 18. If the brushless dc motor 22 has a heavy load, a unity-gain voltage buffer with a larger driving capability can be added to drive the brushless dc motor 22. The method that the Time-Voltage Digital/Analog Converter 12 outputs analog signals to the driver circuit 20 will be described below.

Figure 2:
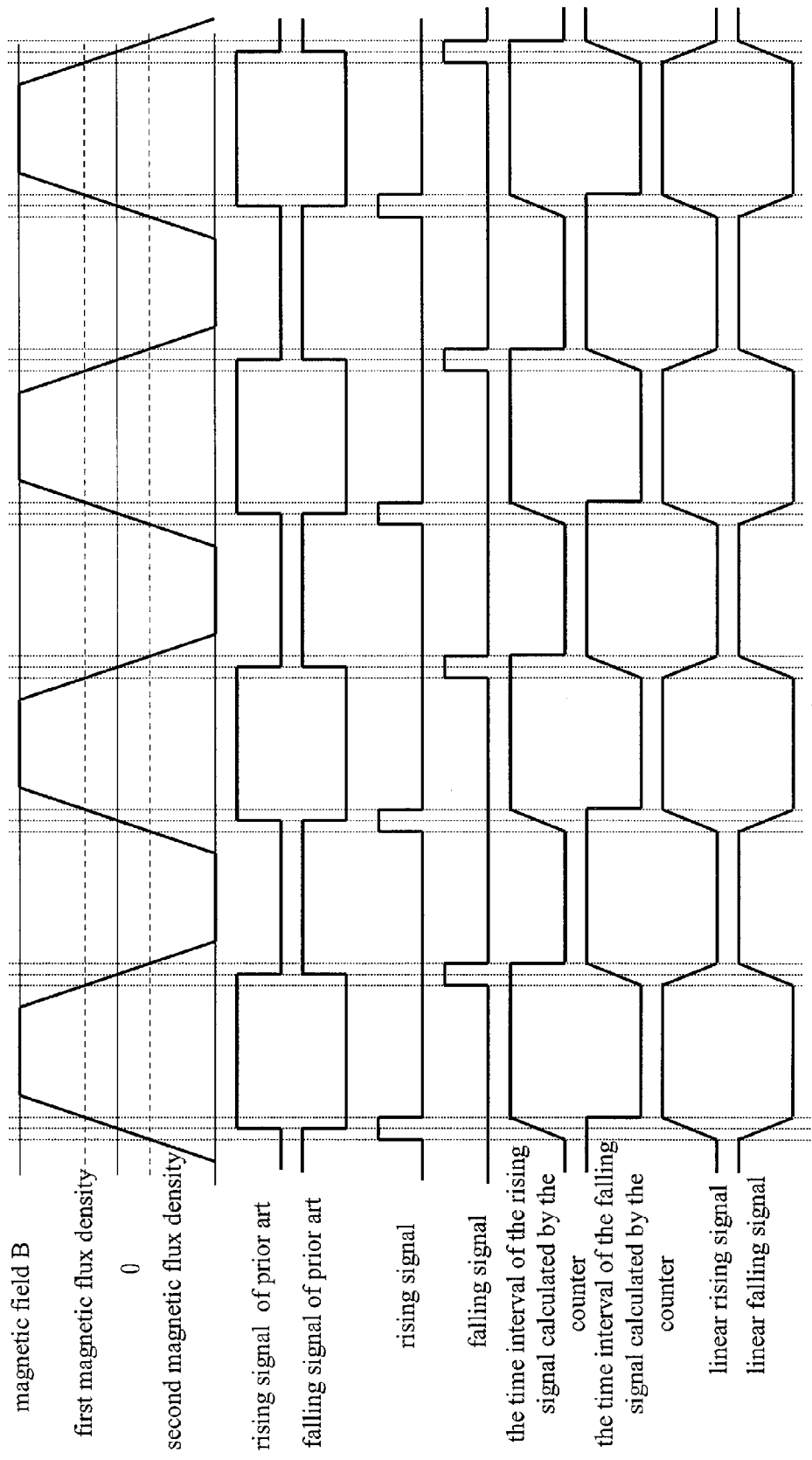
FIG. 2 is the timing diagram of the signals according to the present invention.

The magnetic field detecting circuit 14 of the Time-Voltage Digital/Analog Converter 12 is a Hall sensor, which detects the periodically varying magnetic field of the brushless dc motor 22 and then outputs detected signals. As shown in FIG. 2, the magnetic field detecting circuit 14 can detect the maximum magnetic flux density, a first magnetic flux density (Bth+), 0 magnetic flux density, a second magnetic flux density (Bth−) and the minimum magnetic flux density in the periodically varying magnetic field of the brushless dc motor 22, wherein the first magnetic flux density is between the maximum magnetic flux density and 0 magnetic flux density, and the second magnetic flux density is between 0 magnetic flux density and the minimum magnetic flux density, and multiple magnetic field detecting circuits 14 are used to detect the first and second magnetic flux density.

The counters 16 are connected to the magnetic field detecting circuits 14 and used to calculate the phase-switching time, the time interval of the rising signal and the time interval of the falling signal during the magnetic field variation of the brushless dc motor 22. As shown in FIG. 2, the time interval of the rising signal is used to calculate the time interval from the first magnetic flux density to the second magnetic flux density.

Figure 3:
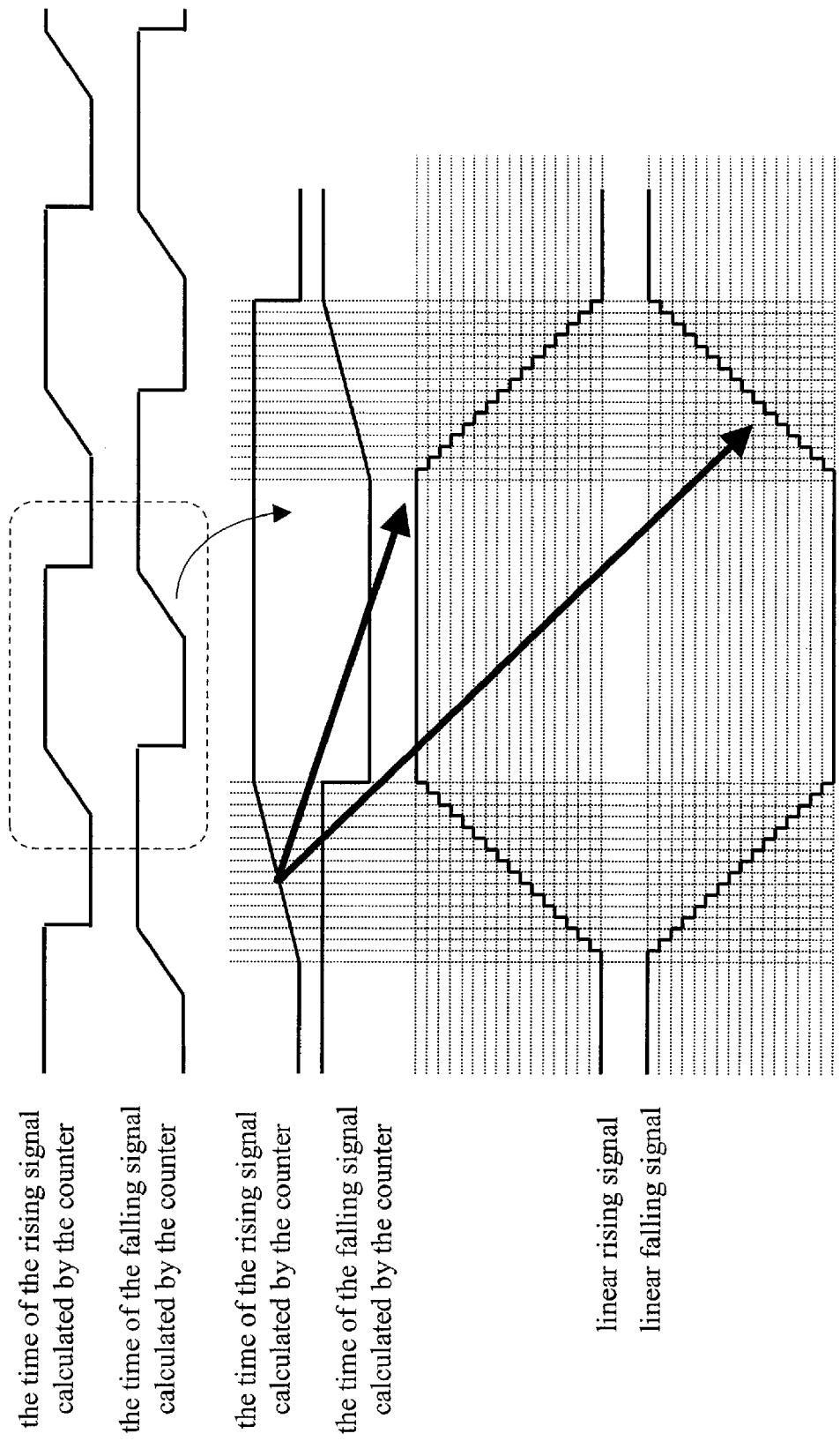
FIG. 3 is an enlarged view of the signals of the counters and the linearly varying signals according to the present invention.

The signal processor 18 is connected to the counters 16. The signal processor 18 divides the time interval of the rising signal and the time interval of the falling signal calculated by the counters 16 into a plurality of time segments (N time segments) respectively, wherein N is a positive integer. Then, as shown in FIG. 3, according to the signal detected by the magnetic field detecting circuit 14, the time interval of the rising signal and the time interval of the falling signal calculated during the magnetic field variation, the signal processor 18 generates and outputs a corresponding linearly rising signal and a corresponding linearly falling signal.

As to the operation of the signal processor 18, the signal processor 18 divides the time interval of the falling signal calculated during the magnetic field variation into N time segments, transforms the fraction of the falling signal corresponding to each time segment into a corresponding falling step waveform and then combines all the falling step waveforms into the linearly falling signal. The signal processor 18 divides the time interval of the rising signal calculated during the magnetic field variation into N time segments, transforms the fraction of the rising signal corresponding to each time segment into a corresponding rising step waveform and then combines all the rising step waveforms into the linearly rising signal.

The signal processor 18 is connected to the driver circuit 20 and outputs the linearly falling signal and the linearly rising signal to the driver circuit 20. The driver circuit 20 is connected to the brushless dc motor 22 and utilizes the linearly falling signal and the linearly rising signal to drive the brushless dc motor 22. In the present invention, the falling signal and the rising signal are respectively transformed into the linearly falling signal and the linearly rising signal, which are then used to drive the brushless dc motor 22 and reduce the vibration or shock noise occurring in the operation of the brushless dc motor 22.

The point of the 0 magnetic flux density detected by the Hall sensor shown in FIG. 2 is the optimal phase-switching point. In the conventional technology, the phase is digitally switched at the optimal phase-change point, but such a switching method makes the rotation torque of the brushless dc motor 22 changes abruptly and generates greater vibration or shock noise. In the present invention, based on the time interval of the rising signal and the time interval of the falling signal calculated during the preceding magnetic field variation, the Time-Voltage Digital/Analog Converter 12 calculates the elapsed time from the current phase-switching point and generates the linearly rising signal and the linearly falling signal; then, those two sets of linearly-varying voltages are used to drive the brushless dc motor 22.

It is to be noted that the magnetic field detecting circuit 14 detects the periodic magnetic field variation when the magnetic field of the brushless dc motor 22 is between the first magnetic flux density and the second magnetic flux density. Therefore, the phase-switching speed can be adjusted via adjusting the first magnetic flux density and the second magnetic flux density.

Those described above are the preferred embodiments to exemplify the present invention. However, it is not intended to limit the scope of the present invention. Any equivalent modification and variation according to the spirit of the present invention is to be also included within the scope of the claims of the present invention.

What is claimed is:

1. A brushless dc motor driver circuit capable of reducing vibration or shock noise, comprising:
    a brushless dc motor;
    at least one magnetic field detecting circuit, detecting a periodically varying magnetic field of said brushless dc motor and then outputting a detected signal;
    at least one counter, connected to said magnetic field detecting circuits and used to calculate a time interval of a rising signal and a time interval of a falling signal during the magnetic field variation of said brushless dc motor via said magnetic field detecting circuits;
    a signal processor, connected to said counters, dividing the time interval of said rising signal and the time interval of said falling signal into a plurality of time segments respectively, generating and outputting a corresponding linearly rising signal and a corresponding linearly falling signal according to said detected signal; and
    a driver circuit, connected to said signal processor and said brushless dc motor, receiving said linearly falling signal and said linearly rising signal, and utilizing said linearly falling signal and said linearly rising signal to drive said brushless dc motor.

2. The brushless dc motor driver circuit capable of reducing vibration or shock noise according to claim 1, wherein said signal processor divides the time interval of said falling signal calculated during the magnetic field variation into N time segments, transforms a fraction of the falling signal corresponding to each time segment into a corresponding falling step waveform and then combines all said falling step waveforms into said linearly falling signal.

3. The brushless dc motor driver circuit capable of reducing vibration or shock noise according to claim 2, wherein N is a positive integer.

4. The brushless dc motor driver circuit capable of reducing vibration or shock noise according to claim 1, wherein said falling signal is used to calculate a time interval from a first magnetic flux density to a second magnetic flux density.

5. The brushless dc motor driver circuit capable of reducing vibration or shock noise according to claim 1, wherein said signal processor divides the time interval of said rising signal calculated during the magnetic field variation into N time segments, transforms a fraction of the rising signal corresponding to each time segment into a corresponding rising step waveform and then combines all said rising step waveforms into said linearly rising signal.

6. The brushless dc motor driver circuit capable of reducing vibration or shock noise according to claim 5, wherein N is a positive integer.

7. The brushless dc motor driver circuit capable of reducing vibration or shock noise according to claim 1, wherein said rising signal is used to calculate the time interval from the second magnetic flux density to the first magnetic flux density.

8. The brushless dc motor driver circuit capable of reducing vibration or shock noise according to claim 1, wherein said magnetic field detecting circuit is a Hall sensor.

9. The brushless dc motor driver circuit capable of reducing vibration or shock noise according to claim 1, wherein said magnetic field detecting circuits, said counters and said signal processor are integrated into a Time-Voltage Digital/Analog Converter.

10. The brushless dc motor driver circuit capable of reducing vibration or shock noise according to claim 9, wherein based on the time interval of said rising signal and the time interval of said falling signal calculated during preceding magnetic field variation, said Time-Voltage Digital/Analog Converter calculates a elapsed time from a current phase-switching point and generates said linearly rising signal and said linearly falling signal; then, those two sets of linearly-varying voltages are used to drive said brushless dc motor.

11. The brushless dc motor driver circuit capable of reducing vibration or shock noise according to claim 1, wherein a first magnetic flux density (Bth+) is defined in between a maximum magnetic flux density and 0 magnetic flux density of the periodically varying magnetic field detected by said magnetic field detecting circuit; a second magnetic flux density (Bth−) is defined in between 0 magnetic flux density and a minimum magnetic flux density of the periodically varying magnetic field detected by said magnetic field detecting circuit; and a phase-change speed of said brushless dc motor is modified via adjusting said first magnetic flux density (Bth+) and said second magnetic flux density (Bth−).

12. The brushless dc motor driver circuit capable of reducing vibration or shock noise according to claim 11, wherein said magnetic field detecting circuit includes: a first magnetic field detecting circuit and a second magnetic field detecting circuit, which are respectively used to detect said first magnetic flux density and said second magnetic flux density.

13. The brushless dc motor driver circuit capable of reducing vibration or shock noise according to claim 11, wherein said magnetic field detecting circuit detects the periodic magnetic field variation of said brushless dc motor when the magnetic field of said brushless dc motor is between said first magnetic flux density and said second magnetic flux density.

14. The brushless dc motor driver circuit capable of reducing vibration or shock noise according to claim 1, further comprising a voltage buffer arranged between said driver circuit and said signal processor.

15. A method for controlling a brushless dc motor driver circuit to reduce vibration or shock noise, comprising the following steps:
   detecting the periodically varying magnetic field of a brushless dc motor and then outputting a detected signal;
   calculating a time intervals of the periodic magnetic field variation, including: a time interval of a rising signal during the magnetic field variation and a time interval of a falling signal during the magnetic field variation;
   dividing the time interval of said rising signal and the time interval of said falling signal into a plurality of time segments respectively, generating and outputting a corresponding linearly rising signal and a corresponding linearly falling signal according to said detected signal; and
   outputting said linearly rising signal and said linearly falling signal to drive said brushless dc motor and reduce the vibration or shock noise thereof.

16. The method for controlling a brushless dc motor driver circuit to reduce vibration or shock noise according to claim 15, wherein the time interval of said falling signal calculated during the magnetic field variation is divided into N time segments; a fraction of said falling signal corresponding to each time segment is transformed into a corresponding falling step waveform; and all said falling step waveforms are combined into said linearly falling signal.

17. The method for controlling a brushless dc motor driver circuit to reduce vibration or shock noise according to claim 16, wherein N is a positive integer.

18. The method for controlling a brushless dc motor driver circuit to reduce vibration or shock noise according to claim 15, wherein said falling signal is used to calculate a time interval from a first magnetic flux density to a second magnetic flux density.

19. The method for controlling a brushless dc motor driver circuit to reduce vibration or shock noise according to claim 15, wherein the time interval of said rising signal calculated during the magnetic field variation is divided into N time segments; a fraction of said rising signal corresponding to each time segment is transformed into a corresponding rising step waveform; and all said rising step waveforms are combined into said linearly rising signal.

20. The method for controlling a brushless dc motor driver circuit to reduce vibration or shock noise according to claim 19, wherein N is a positive integer.

21. The method for controlling a brushless dc motor driver circuit to reduce vibration or shock noise according to claim 15, wherein said rising signal is used to calculate a time interval from a second magnetic flux density to a first magnetic flux density.

22. The method for controlling a brushless dc motor driver circuit to reduce vibration or shock noise according to claim 15, wherein a Hall sensor is used to detect the periodically varying magnetic field of said brushless dc motor.

23. The method for controlling a brushless dc motor driver circuit to reduce vibration or shock noise according to claim 15, wherein based on the time interval of said rising signal and the time interval of said falling signal calculated during the preceding magnetic field variation, the elapsed time is calculated from a current phase-switching point, and said linearly rising signal and said linearly falling signal are generated; then, those two sets of linearly-varying voltages are used to drive said brushless dc motor.

24. The method for controlling a brushless dc motor driver circuit to reduce vibration or shock noise according to claim 15, wherein a first magnetic flux density (Bth+) is defined in between a maximum magnetic flux density and 0 magnetic flux density detected during detecting the periodically varying magnetic field of said brushless dc motor; a second magnetic flux density (Bth−) is defined in between 0 magnetic flux density and a minimum magnetic flux density detected during detecting the periodically varying magnetic field of said brushless dc motor; and a phase-switching speed of said brushless dc motor is adjusted via adjusting said first magnetic flux density (Bth+) and said second magnetic flux density (Bth−).

25. The method for controlling a brushless dc motor driver circuit to reduce vibration or shock noise according to claim 24, wherein the periodically varying magnetic field variation of said brushless dc motor is detected when the magnetic field of said brushless dc motor is between said first magnetic flux density and said second magnetic flux density.

* * * * *